(12) United States Patent
Yoder

(10) Patent No.: US 9,120,656 B2
(45) Date of Patent: Sep. 1, 2015

(54) ROPE ANCHOR FOR A WINCH

(75) Inventor: Bryan Yoder, Corvallis, OR (US)

(73) Assignee: Warn Industries, Inc., Clackamas, OR (US)

( * ) Notice: Subject to any disclaimer, the term of this patent is extended or adjusted under 35 U.S.C. 154(b) by 0 days.

(21) Appl. No.: 13/523,476

(22) Filed: Jun. 14, 2012

(65) Prior Publication Data
US 2013/0334479 A1   Dec. 19, 2013

(51) Int. Cl.
*B66D 1/30* (2006.01)
*B66D 1/34* (2006.01)
*F16G 11/00* (2006.01)
*F16G 11/04* (2006.01)

(52) U.S. Cl.
CPC ...... *B66D 1/34* (2013.01); *F16G 11/00* (2013.01); *F16G 11/046* (2013.01)

(58) Field of Classification Search
CPC ......... B66D 1/34; F16G 11/046; F16G 11/04; B65H 75/26
USPC ........................................ 254/278, 371, 373
See application file for complete search history.

(56) References Cited

U.S. PATENT DOCUMENTS

| | | | | |
|---|---|---|---|---|
| 424,388 | A * | 3/1890 | Weigel | 403/211 |
| 1,369,842 | A * | 3/1921 | Schaffernocker | 24/136 K |
| 1,380,800 | A * | 6/1921 | Haworth | 403/211 |
| 1,555,544 | A * | 9/1925 | Anthony | 242/587.1 |
| 1,859,561 | A | 5/1932 | Haworth | |
| RE18,789 | E * | 4/1933 | Gahagan | 254/317 |
| 1,913,508 | A * | 6/1933 | Phillips | 242/587.1 |
| 2,053,976 | A * | 9/1936 | Stahl | 254/375 |
| 2,085,333 | A | 6/1937 | Reynolds | |
| 2,314,733 | A * | 3/1943 | Owen | 254/373 |
| 2,329,943 | A * | 9/1943 | Robins | 242/587.1 |
| 2,420,594 | A * | 5/1947 | Hall | 242/586.1 |
| 2,540,887 | A * | 2/1951 | Hyatt | 24/68 R |
| 2,827,680 | A * | 3/1958 | Gibson | 403/211 |
| 3,582,011 | A | 6/1971 | Murray | |
| 3,654,672 | A * | 4/1972 | Bullar | 24/136 K |
| 3,905,711 | A | 9/1975 | Rogers | |
| 4,313,243 | A * | 2/1982 | Childress et al. | 24/136 K |

(Continued)

FOREIGN PATENT DOCUMENTS

| | | |
|---|---|---|
| CN | 101844733 A | 9/2010 |
| CN | 201729616 U | 2/2011 |

(Continued)

OTHER PUBLICATIONS

Canadian Intellectual Property Office, Office Action of Canadian Patent Application No. 2814475, Mar. 3, 2014, 3 pages.

*Primary Examiner* — Emmanuel M Marcelo
*Assistant Examiner* — Michael Gallion
(74) *Attorney, Agent, or Firm* — Alleman Hall McCoy Russell & Tuttle LLP

(57) ABSTRACT

A winch includes a motor and a rotatable drum drivingly attached to the motor. The rotatable drum includes an anchor pocket therein. A cable includes a proximal end connected to the rotatable drum by an anchor received in said anchor pocket with the cable wrapped around the anchor. The anchor includes a first slot in a surface thereof and the rotatable drum includes a second slot therein adjacent to the anchor pocket that allows access to the first slot in the anchor. An edge of the second slot forms a fulcrum point for a pry tool inserted into the first and second slots for freeing the anchor from the anchor pocket.

6 Claims, 3 Drawing Sheets

(56) References Cited

U.S. PATENT DOCUMENTS

| | | | |
|---|---|---|---|
| 4,362,288 A | 12/1982 | Allen | |
| 4,534,522 A * | 8/1985 | Spence | 242/172 |
| 4,614,007 A * | 9/1986 | Else | 24/136 K |
| 5,199,137 A * | 4/1993 | Edwards | 24/136 K |
| 5,336,846 A | 8/1994 | Sachs | |
| 5,388,480 A * | 2/1995 | Townsend | 74/501.5 R |
| 5,553,360 A * | 9/1996 | Lucas et al. | 24/136 K |
| 5,639,043 A * | 6/1997 | Baird | 242/419.4 |
| 5,779,226 A * | 7/1998 | Wudtke | 254/278 |
| 5,988,095 A * | 11/1999 | Kallenberger | 114/230.23 |
| 5,988,929 A | 11/1999 | Doan | |
| 6,058,575 A * | 5/2000 | Dagan | 24/136 R |
| D489,157 S * | 4/2004 | Lawson | D34/33 |
| 6,854,164 B2 * | 2/2005 | Bass et al. | 24/136 R |
| 6,898,827 B1 * | 5/2005 | Postelwait et al. | 24/136 L |
| 6,981,670 B2 * | 1/2006 | Harrington | 242/402 |
| 7,108,248 B2 * | 9/2006 | Winter et al. | 254/371 |
| 7,513,452 B2 * | 4/2009 | Ruan | 242/587.1 |
| 8,079,570 B2 * | 12/2011 | Ruan | 254/371 |
| 8,763,992 B2 | 7/2014 | Imbusch et al. | |
| 2002/0104918 A1 * | 8/2002 | Zacharias | 242/587.1 |

FOREIGN PATENT DOCUMENTS

| | | |
|---|---|---|
| DE | 102009054226 B3 | 2/2011 |
| JP | H10245194 A | 9/1998 |
| JP | 2001129031 A | 5/2001 |
| JP | 3333769 B2 | 10/2002 |
| JP | 2004035125 A | 2/2004 |
| WO | 9736123 A1 | 10/1997 |

\* cited by examiner

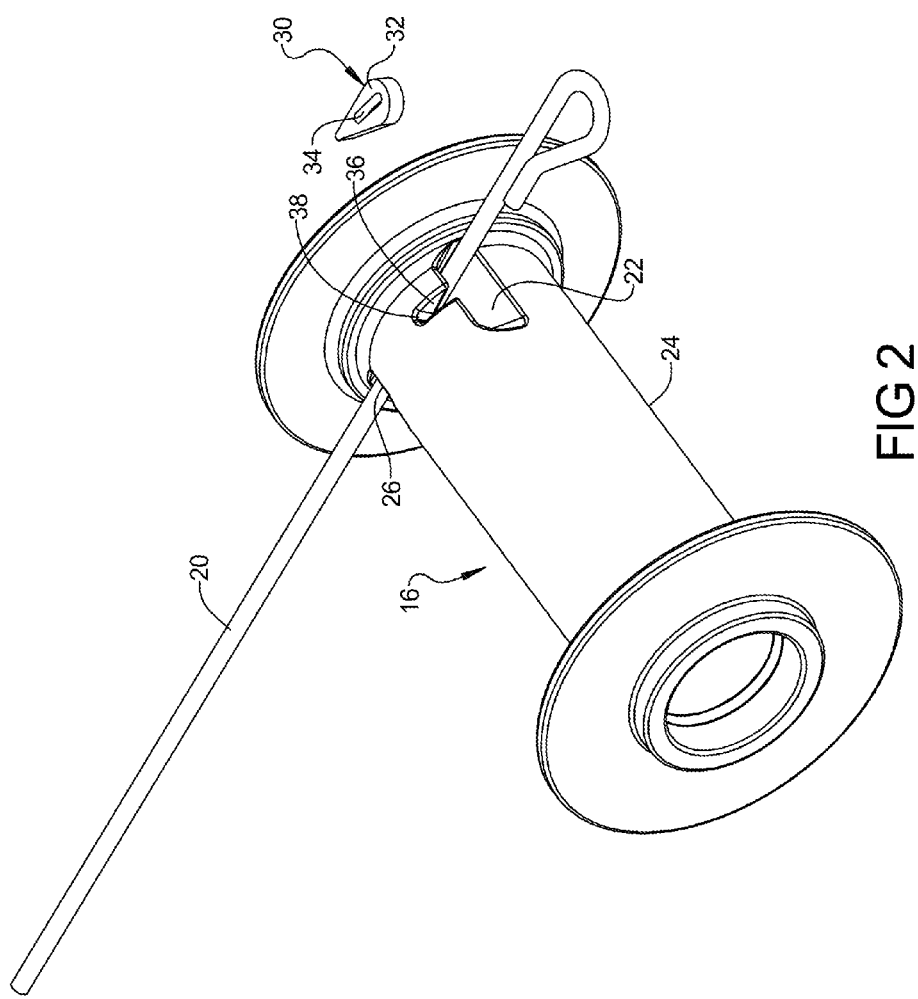

ROPE ANCHOR FOR A WINCH

FIELD

The present disclosure relates to a winch and more particularly to a rope anchor for a winch that allows for easy removal of the anchor after being set in place by the loading of the winch.

BACKGROUND

This section provides background information related to the present disclosure which is not necessarily prior art.

Winches commonly include a motor for driving a drum on which a cable can be wound or un-wound. The motor can be an electric, hydraulic, or a gas powered motor. The cable can be a rope, a wire cable, or other type of line or strap. When the cable becomes worn, it can be necessary to change the cable. Thus, it is desirable to provide a cable connection to the drum that effectively anchors the cable to the drum and further provides an easy method of disconnecting the cable from the drum. Cables have been connected to the drum by a wedge-shaped anchor that is received in a wedge-shaped pocket in the drum. When a load is applied to the rope by the motor and gear train, the anchor is drawn tightly into the anchor pocket in the drum. The higher the load applied to the cable, the more difficult it can be to remove the anchor from the anchor pocket. Accordingly, it is desirable to provide a system to improve the ability to remove an anchor to allow a cable of a winch to be changed without damaging the rotatable drum.

SUMMARY

This section provides a general summary of the disclosure, and is not a comprehensive disclosure of its full scope or all of its features.

A winch includes a motor and a rotatable drum drivingly attached to the motor. The rotatable drum includes an anchor pocket therein. A cable includes a proximal end connected to the rotatable drum by an anchor received in said anchor pocket with the cable wrapped around the anchor. The anchor includes a first slot in a surface thereof and the rotatable drum includes a second slot therein adjacent to the anchor pocket that allows access to the first slot in the anchor. An edge of the second slot forms a fulcrum point for a pry tool inserted into the first and second slots for freeing the anchor from the anchor pocket.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 2 is an exploded perspective view of a winch drum, cable, and anchor system according to the principles of the present disclosure;

Corresponding reference numerals indicate corresponding parts throughout the several views of the drawings.

DETAILED DESCRIPTION

Figure 1:
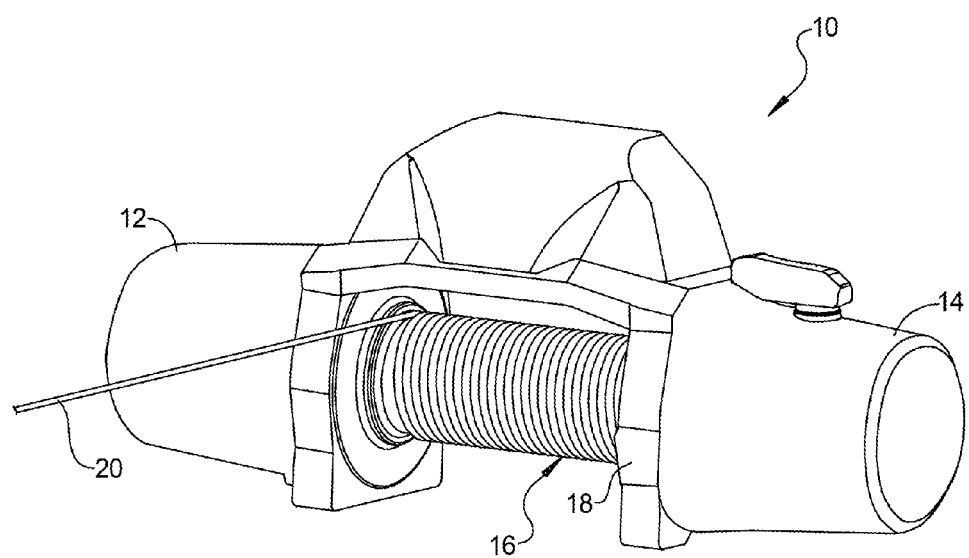
FIG. 1 is a perspective view of an exemplary winch according to the principles of the present disclosure.
Figure 4:
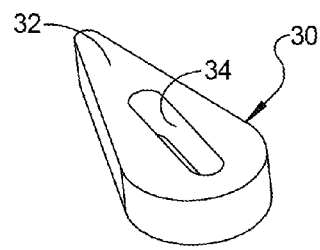
FIG. 4 is a perspective view of an anchor according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, an exemplary winch 10 according to the principles of the present disclosure includes a motor 12, a gear train 14 rotatably connected with the motor 12, and a drum 16 rotatably driven by the motor 12 and gear train 14. The drum 16 can be supported on both ends by a drum support 18. A cable 20 is wound onto the drum 16 and can be spooled out or spooled in for performing various pulling operations.

With reference to FIG. 2, the rotatable drum 16 includes an anchor pocket 22 disposed in a cylindrical body 24 thereof. The anchor pocket 22 can be wedge-shaped, or other shapes can be used. The cable 20 extends through an opening 26 that communicates with the anchor pocket 22 wherein the proximal end of the cable 20 wraps around an anchor 30 that is received within the anchor pocket 22. The anchor 30 can be wedged-shaped, circular, oval, or have other shapes and can include first and second side faces 32 at least one of which can be provided with a slot 34 that can extend through the anchor or can be formed like a divot, recess, pocket, or a raised edge. The proximal end of the cable 20 wraps around the anchor 30 and can be clamped to itself and pulled tightly so that the anchor 30 is wedged within the anchor pocket 22 of the rotatable drum 16. The cable drum is provided with a slot 36 that is adjacent to the anchor pocket 22 and communicates with the slot 34 in the anchor 30 when the anchor 30 is inserted into the anchor pocket 22.

Figure 3:
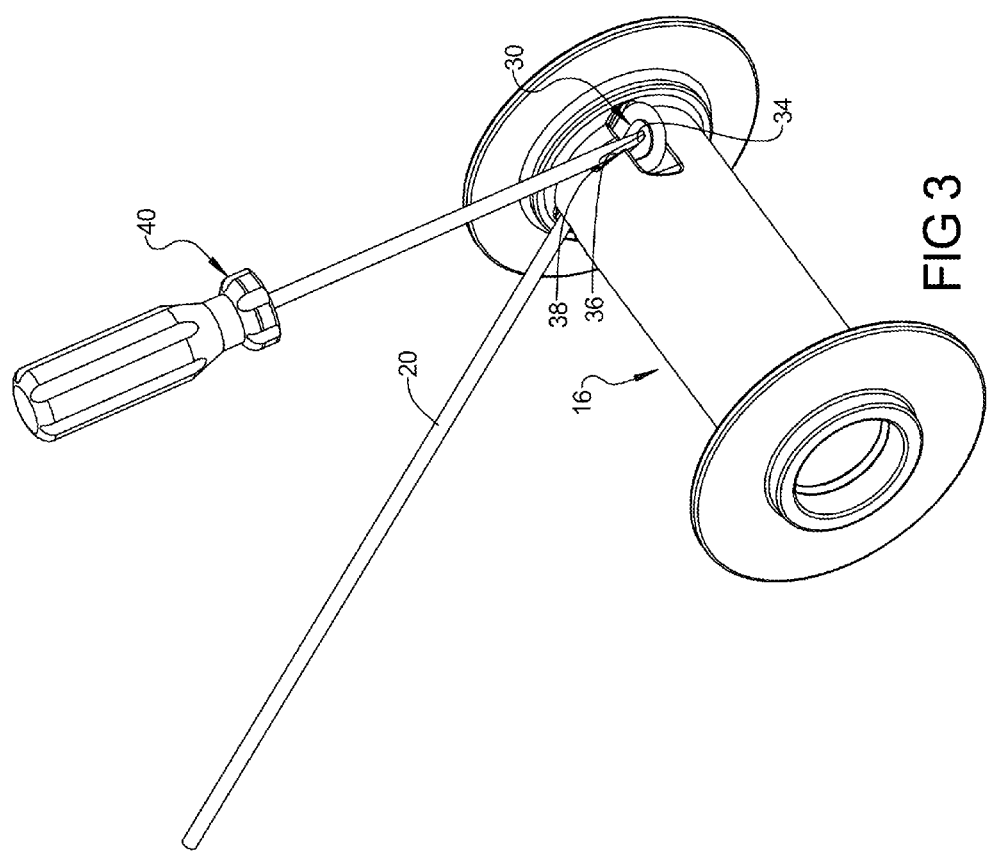
FIG. 3 is a perspective view of a winch drum/cable assembly illustrating a process for removing the cable anchor from the drum according to the principles of the present disclosure.

With reference to FIG. 3, a pry tool such as a screwdriver 40 can be inserted in the slot 36 of the rotatable drum 16 as well as the slot 34 of the anchor 30 and the inner edge 38 of the slot 36 can be used as a fulcrum point to allow pry tool 40 to pry the anchor 30 out of the anchor pocket 22 so that the cable 20 can be disconnected from the drum to be replaced or repaired. The corresponding slots 34 and 36 provided in the anchor 30 and rotatable drum 16 provide easy access for removal of the anchor 30 that has not been available in prior cable anchor systems. It is noted that the winch 10 can be rated at greater than 6,000 pounds and, therefore, the anchor 30 can become tightly wedged within the anchor pocket 22 making its removal very difficult. However, with the improved design of the present disclosure, removal of the anchor 30 from the anchor pocket 22 has been greatly improved.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A winch, comprising:
a motor;
a wedge-shaped anchor having a side face, the side face including a first slot in a surface thereof;
a rotatable drum drivingly attached to said motor, said rotatable drum having a cylindrical body surface and including a wedge-shaped anchor pocket in the cylindrical body surface, a second slot in the cylindrical body surface continuous with the wedge-shaped anchor pocket, and an opening in the cylindrical body surface that communicates with the wedge-shaped anchor pocket and the second slot;
a cable having a proximal end and a distal end, said proximal end being connected to said rotatable drum by the wedge-shaped anchor when the wedge-shaped anchor is received in said wedge-shaped anchor pocket with said cable wrapped directly around said wedge-shaped anchor, the cable extending through the opening in the drum,
wherein, when the wedge-shaped anchor is received in said wedge-shaped anchor pocket, the second slot allows access to said first slot in said wedge-shaped anchor.

2. The winch according to claim 1, wherein said wedge-shaped anchor has a pair of side faces in which said first slot extends, and said second slot is aligned with said first slot when said wedge-shaped anchor is received in said wedge-shaped anchor pocket.

3. A winch comprising:
a motor;
an anchor having a side face, the side face including a first slot in a surface thereof;
a rotatable drum drivingly attached to said motor, said rotatable drum having a cylindrical body surface and including an anchor pocket in the cylindrical body surface, a second slot in the cylindrical body surface continuous with the anchor pocket that allows access to the first slot, and an opening in the cylindrical body surface that communicates with the anchor pocket and the second slot;
a cable having a proximal end and a distal end, said proximal end being connected to said rotatable drum by the anchor when the anchor is received in said anchor pocket with said cable wrapped directly around said anchor, the cable extending through the opening in the drum;
wherein an edge of said second slot forms a fulcrum point for a pry tool inserted into said first and second slots, the pry tool adapted to pry the anchor out of the anchor pocket via the fulcrum point so that the cable can be disconnected from the drum.

4. A cable anchor system for a rotatable drum, comprising:
a rotatable drum having a cylindrical body surface, the cylindrical body surface including a wedge-shaped anchor pocket therein; and
a cable having a proximal end and a distal end, said proximal end being connected to said rotatable drum by a wedge-shaped anchor received in said wedge-shaped anchor pocket with said cable wrapped directly around said wedge-shaped anchor, wherein a side face of said wedge-shaped anchor includes a first slot in a surface thereof and said cylindrical body surface of said rotatable drum includes a second slot therein continuous with said wedge-shaped anchor pocket that allows access to said first slot in said wedge-shaped anchor, and wherein the cylindrical body surface of said rotatable drum further includes an opening that communicates with the anchor pocket and the second slot, the cable extending through the opening.

5. The cable anchor system according to claim 4, wherein said wedge-shaped anchor has a pair of side faces in which said first slot extends, and said second slot is aligned with said first slot when said wedge-shaped anchor is received in said wedge-shaped anchor pocket.

6. A cable anchor system for a rotatable drum, comprising:
a rotatable drum having a cylindrical body surface, the cylindrical body surface including an anchor pocket therein; and
a cable having a proximal end and a distal end, said proximal end being connected to said rotatable drum by an anchor received in said anchor pocket with said cable wrapped directly around said anchor,
wherein said anchor includes a first slot in a surface thereof and said cylindrical body surface of said rotatable drum includes a second slot therein continuous with said anchor pocket that allows access to said first slot in said anchor, the cylindrical body surface of the rotatable drum further including an opening that communicates with the anchor pocket and the second slot, the cable extending through the opening;
wherein an edge of said second slot forms a fulcrum point for a pry tool inserted into said first and second slots for freeing said anchor from said anchor pocket.

\* \* \* \* \*